(12) United States Patent
Fujimoto et al.

(10) Patent No.: US 10,255,465 B2
(45) Date of Patent: Apr. 9, 2019

(54) MAGNETIC INFORMATION PROCESSING DEVICE AND MAGNETIC INFORMATION PROCESSING METHOD

(71) Applicant: NIDEC SANKYO CORPORATION, Suwa-gun, Nagano (JP)

(72) Inventors: Masaya Fujimoto, Nagano (JP); Shigeki Ozawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 37 days.

(21) Appl. No.: 15/339,123

(22) Filed: Oct. 31, 2016

(65) Prior Publication Data

US 2017/0124359 A1 May 4, 2017

(30) Foreign Application Priority Data

Oct. 30, 2015 (JP) ................................. 2015-214837

(51) Int. Cl.
*G06K 7/08* (2006.01)
*G06K 7/00* (2006.01)
*G06K 13/08* (2006.01)

(52) U.S. Cl.
CPC ........... *G06K 7/087* (2013.01); *G06K 7/0069* (2013.01); *G06K 13/08* (2013.01)

(58) Field of Classification Search
USPC ....................................................... 235/449
See application file for complete search history.

(56) References Cited

U.S. PATENT DOCUMENTS

| 5,870,155 A * | 2/1999 | Erlin .................... G06Q 20/341 348/734 |
| 2012/0138683 A1* | 6/2012 | Sather .................. G06Q 20/322 235/449 |

FOREIGN PATENT DOCUMENTS

JP 2012216264 A 11/2012

* cited by examiner

*Primary Examiner* — Rafferty Kelly
(74) *Attorney, Agent, or Firm* — Cantor Colburn LLP

(57) ABSTRACT

A magnetic information processing device for use with a magnetic recording medium storing a magnetic signal may include a magnetic card detection unit comprising a sensor and being structured to detect insertion of the magnetic recording medium; a magnetic head structured to read the magnetic signal recorded in the magnetic recording medium, and output the magnetic signal as an analog signal; a signal detection unit structured to amplify the analog signal output from the magnetic head, and output a detection output signal when the analog signal exceeds a predetermined threshold value of a magnetic detection sensitivity; and a judgment unit structured to judge that the detection output signal output by the signal detection unit is different from the magnetic signal recorded in the magnetic recording medium, when no insertion of the magnetic recording medium is detected by the magnetic card detection unit.

5 Claims, 9 Drawing Sheets

MAGNETIC INFORMATION PROCESSING DEVICE AND MAGNETIC INFORMATION PROCESSING METHOD

CROSS REFERENCE TO RELATED APPLICATIONS

The present application claims priority under 35 U.S.C. § 119 to Japanese Application No. 2015-214837, filed Oct. 30, 2015, the entire content of which is incorporated herein by reference.

FIELD OF THE INVENTION

At least an embodiment of the present invention relates to a magnetic information processing device and a magnetic information processing method that are for reading magnetic information recorded in a magnetic information recording medium such as a card, and for newly writing magnetic information into a card and the like.

BACKGROUND

Conventionally, there is used a card reader, as an example of a magnetic information processing device, which is for reading magnetic information recorded in a card, and for newly writing magnetic information into a card, by way of making a magnetic head contact a magnetic stripe prepared on the card, and slide on the magnetic stripe.

Sometimes, a magnetic head installed in a card reader may pick up a foreign magnetic noise and the like, coming from a surrounding environment, as a magnetic signal. In other words, sometimes such a magnetic noise may have a negative impact on the magnetic head so that magnetic information cannot correctly be read out. Then, for example, in Patent Document 1, there is described a magnetic head provided with a card detection circuit in order to detect a card being drawn in, by the intermediary of a changeover switch, the magnetic head being for a card reader that implements a countermeasure against a foreign magnetic noise. If an analog signal generated by the magnetic head exceeds a threshold value that has been set, when a card-like medium is drawn in, the card detection circuit outputs a signal notifying of a card being detected (detection output signal), and transfers the signal to a higher-level device. At a time when the higher-level device receives the detection output signal, the changeover switch operates to shift a status of the magnetic head device from a standby state to a working state.

PATENT DOCUMENT

Patent Document 1: Japanese Unexamined Patent Application Publication No. 2012-216264

In recent years, the number of devices generating a noise increases in an environment where a card reader is installed. An electromagnetic noise is constantly radiated from various electronic devices, for example, such as a mobile phone base station, a Wi-Fi router, a security gate for theft prevention, and the like. In the meantime, there are various environments for installation of a card reader, and it is difficult to figure out in advance how significant a noise having an effect on reading magnetic information by a card reader is. Accordingly, in the case of the card detection circuit described in Patent Document 1, there is a threat that; at a time of an intense foreign noise, an analog signal generated by the magnetic head exceeds a specified threshold value so as to be output as a detection output signal by mistake.

At least an embodiment of the present invention provides a magnetic information processing device and a magnetic information processing method with which it becomes possible to certainly read out information of a magnetic information recording medium even in an environment with a lot of noise.

A magnetic information processing device according to at least an embodiment of the present invention includes: a magnetic card detection unit for detecting a magnetic recording medium having been inserted, by use of a sensor; a magnetic head for reading a magnetic signal recorded in the magnetic recording medium, and outputting the magnetic signal as an analog signal; a signal detection unit for amplifying the analog signal output from the magnetic head, and outputting a detection output signal in the case of the analog signal exceeding a threshold value of a magnetic detection sensitivity that has been set; and a judgment unit for judging that the detection output signal output by the signal detection unit is different from the magnetic signal recorded in the magnetic recording medium, in the case where no insertion of the magnetic recording medium is detected by the magnetic card detection unit. By making a configuration in this way, it becomes possible to surely discriminate between a magnetic signal and a noise so that a false performance can be controlled.

The magnetic information processing device according to at least an embodiment of the present invention should be a manual card reader, with which the magnetic signal recorded in the magnetic recording medium is read out at a time when a user manually inserts the magnetic recording medium into an internal section of the device, and pulls back the magnetic recording medium from the internal section of the device. By making a configuration in this way, a false performance can be controlled, and a processing efficiency can be improved.

The magnetic information processing device according to at least an embodiment of the present invention should be characterized in that the judgment unit learns about a noise environment that enters the magnetic head, and stores an initial value of the threshold value of the magnetic detection sensitivity, as a learned datum. By making a configuration in this way, a processing efficiency of the device can further be improved.

The magnetic information processing device according to at least an embodiment of the present invention should be characterized in that the threshold value of the magnetic detection sensitivity of the signal detection unit is variable, and there is provided a threshold switching unit for changing the magnetic detection sensitivity; and the judgment unit changes the threshold value of the magnetic detection sensitivity of the signal detection unit by way of the threshold switching unit, in the case where the magnetic signal recorded in the magnetic recording medium is with lessened magnetism. By making a configuration in this way, a potential of reading performance for a magnetic recording medium with lessened-magnetism can be improved.

A magnetic information processing method according to at least an embodiment of the present invention is a magnetic information processing method to be executed by a magnetic information processing device, the magnetic information processing device including: a magnetic card detection unit for detecting a magnetic recording medium having been inserted, by use of a sensor; a magnetic head for reading a magnetic signal recorded in the magnetic recording medium, and outputting the magnetic signal as an analog signal; and a signal detection unit for amplifying the analog signal output from the magnetic head, and outputting a detection output signal in the case of the analog signal exceeding a threshold value of a magnetic detection sensitivity that has been set; wherein, it is judged that the detection output signal output by the signal detection unit is different from the magnetic signal recorded in the magnetic recording medium, in the case where no insertion of the magnetic recording medium is detected by the magnetic card detection unit. By making a configuration in this way, it becomes possible to surely discriminate between a magnetic signal and a noise so that a false performance can be controlled.

According to at least an embodiment of the present invention, it is possible to provide a magnetic information processing device that can certainly read out information of a magnetic recording medium even in an environment with a lot of noise; by way of judging that an analog signal is different from a magnetic signal recorded in the magnetic recording medium, even though there appears a detection output signal in relation to the analog signal from a magnetic head, as far as no insertion of the magnetic recording medium is detected.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention is described below with reference to the accompanying drawings.

[Overview Configuration of Card Reader 1]

Figure 1:
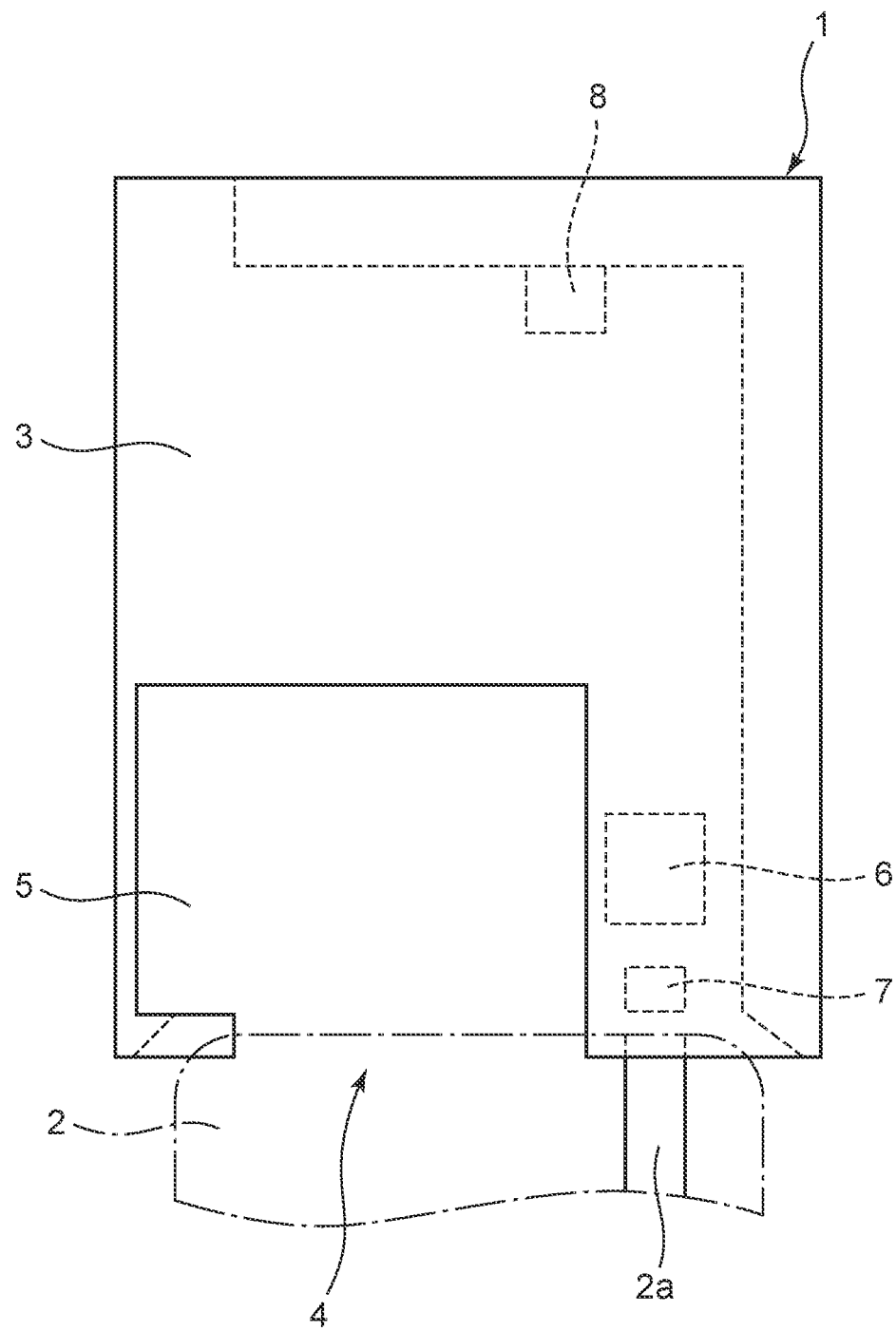
FIG. 1 is a schematic plan view of a card reader according to an embodiment of the present invention.

FIG. 1 is a schematic plan view of a card reader according to an embodiment of the present invention.

A card reader 1 (a magnetic information processing device) according to the embodiment of the present invention is a manual card reader with which a user manually handles a magnetic information recording medium, such as a card 2, in order to read out magnetic information recorded in the card 2. Specifically to describe, the card reader 1 is a so-called dip-type card reader, with which the magnetic information recorded in the card 2 is read out at a time when the user manually inserts the card 2 into an internal section of the device, or pulls back the card 2 from the internal section of the device.

Incidentally, the card reader 1 according to the present embodiment is installed in a higher-level device, such as an automatic teller machine (ATM), and used there. The card reader 1 communicates with the higher-level device, such as an ATM, by the intermediary of an interface unit 90 (shown in FIG. 2).

According to FIG. 1, the card reader 1 is provided with a chassis 3, a magnetic head 6, a front sensor 7, and a rear sensor 8; and meanwhile in the chassis 3 of the card reader 1, there are formed an insertion slot 4 and a cutout part 5. In the present embodiment; as shown in FIG. 1, there is formed a card passage through which the card 2 inserted from the insertion slot 4 passes by. In the meantime, the card reader 1 is equipped with the magnetic head 6 for reading magnetic information recorded in the card 2. Then, the card reader 1 detects the card 2 being inserted into the internal section, by means of a card detection unit including the front sensor 7 and the rear sensor 8. Moreover, although FIG. 1 does not show, the card reader 1 is equipped with a circuit board 9 (shown in FIG. 2) to which the magnetic head 6, the front sensor 7, and the rear sensor 8 are connected, wherein the circuit board 9 includes various circuits for controlling each unit while obtaining a magnetic signal from the magnetic head 6.

The card 2 is, for example, a card-like magnetic recording medium, such as a rectangular card made of PVC, having a thickness of about 0.7 to 0.8 mm. On one side of the card 2, there is formed a magnetic stripe 2a in which a magnetic signal is stored. Incidentally, the card 2 may be a polyethylene-terephthalate (PET) card with a thickness of about 0.18 to 0.36 mm, or a paper-made card and the like having a predetermined thickness.

In one part on a front end side of the card reader 1, there is formed the cutout part 5 that is so cut out as to make it possible for a user to insert the card 2 and pull out the card 2. Accordingly, a part of the card inserted toward a rear end side of the card reader 1 becomes exposed at the cutout part 5. In the meantime, the insertion slot 4 for the card 2 is positioned at a front end of the card passage. In other words, the card passage is so shaped as to be connected to the insertion slot 4. The magnetic head 6 is positioned at a front end side of the card reader. Additionally to describe, the magnetic head 6 is positioned at a bottom side of the card passage shown in FIG. 1.

The user inserts the card 2 from the cutout part 5 into the insertion slot 4, and the card 2 stops at a card stop position, and subsequently the card 2 is pulled out. By this operation, the magnetic signal of the magnetic stripe 2a is read out with the magnetic head 6. The card 2 having been inserted and the card 2 having arrived at the stop position are individually detected by the card detection unit including the front sensor 7 and the rear sensor 8.

Concretely to describe, the card detection unit is provided with a front detection mechanism and a rear detection mechanism. The front detection mechanism according to the present embodiment is a mechanical detection means including a front sensor plate (not shown) as a contacting component, and the front sensor 7 that is a sensor for detecting a displacement of the contacting component. The front detection mechanism is positioned at a front end side of the card reader 1. Then, the front detection mechanism detects the card 2 having been inserted from the insertion slot 4.

On the other hand, the rear detection mechanism according to the present embodiment is a mechanical detection means including a rear sensor plate with which the card 2 contacts, and the rear sensor 8, in a similar way as the front detection mechanism is. The rear detection mechanism is positioned at a rear end side of the card reader 1. Then, the rear detection mechanism detects the card 2 having been inserted up to the rear end side of the card reader 1. In other words, the rear detection mechanism detects that a front edge of the card 2 has arrived at a rear end side of the card passage, and the card 2 has stopped there.

Incidentally, the front sensor plate and the rear sensor plate as the contacting components in the present embodiment contact with the card 2. Meanwhile, the front detection mechanism in the present embodiment is a first detection means, and the rear detection mechanism is a second detection means placed at a rear side of the front detection mechanism as the first detection means.

[Control Configuration of Card Reader 1]

Figure 2:
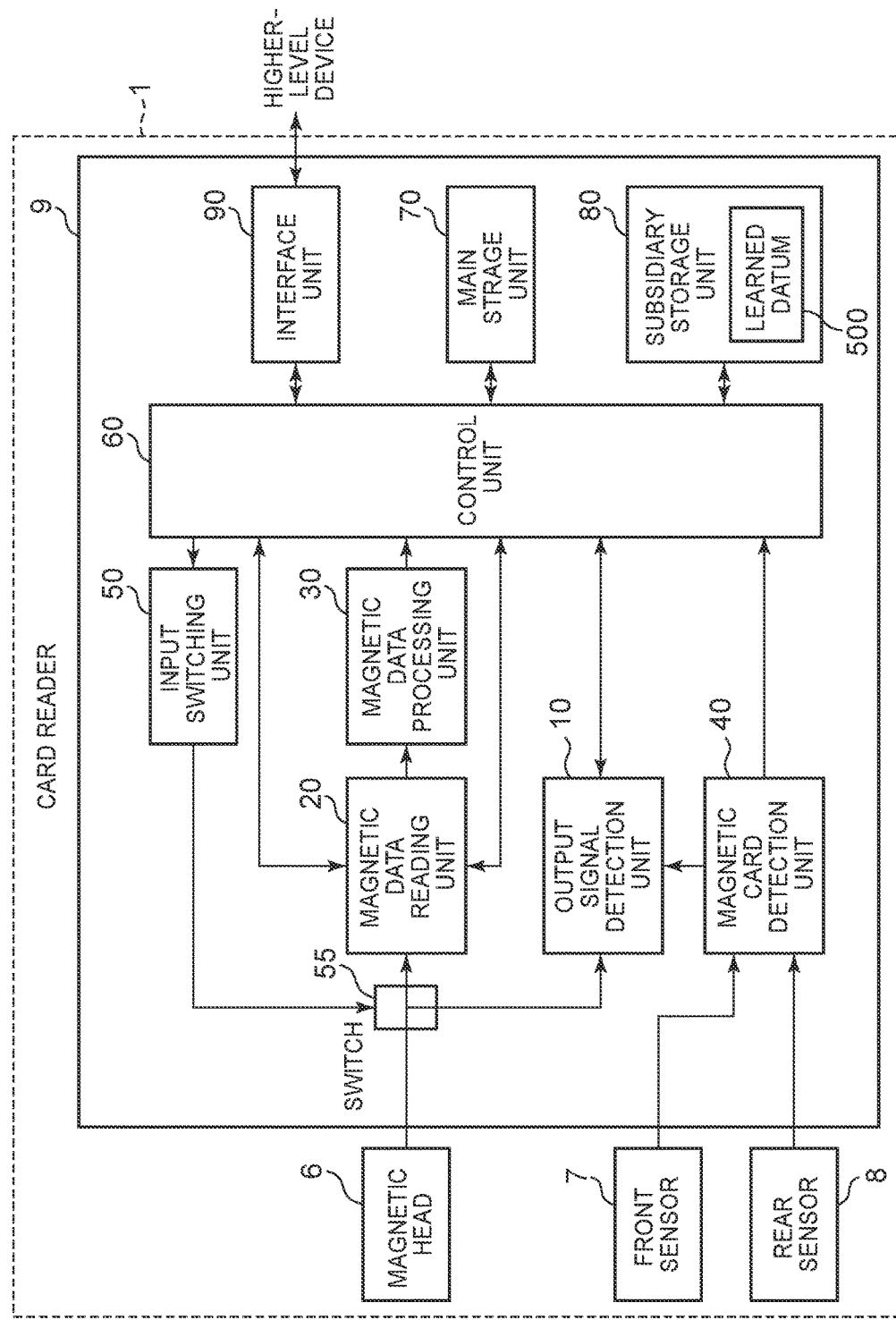
FIG. 2 is a block diagram showing a control configuration of the card reader according to the embodiment of the present invention.

Next, a control configuration of the card reader 1 is explained with reference to FIG. 2. In the card reader 1, the magnetic head 6, the front sensor 7, and the rear sensor 8 are connected to the circuit board 9.

The magnetic head 6 is a magnetic head for recording or reproducing magnetic information by way of writing the magnetic information into the magnetic stripe 2a (shown in FIG. 1) or reading the magnetic information written in the magnetic stripe 2a, respectively; while the magnetic head 6 touches the card 2 and slides on it. A magnetic signal read out by the magnetic head 6 is output as an analog signal. The magnetic head 6 reads out the magnetic information recorded in the card 2, and outputs the analog signal corresponding to the magnetic information that has been read out. Moreover, also at a time when a noise externally enters the magnetic head 6, the noise is output as an analog signal.

As described above, the front sensor 7 and the rear sensor 8 are provided to the front detection mechanism and the rear detection mechanism in order to detect an insertion of the card 2 and an arrival of the card 2 at a rear end of the card passage, respectively. The front sensor 7 is an optical sensor (not shown) and the like, which is provided with a light emitting element and a light receiving element. The front sensor 7 is a sensor to detect a displacement of the front sensor plate, and output a detection signal. The rear sensor 8 is an optical sensor (not shown) and the like, which is provided with a light emitting element and a light receiving element, in a similar way as the front sensor 7 is. The rear sensor 8 is a sensor to detect a displacement of the rear sensor plate, and output a detection signal. Incidentally, the front sensor 7 and the rear sensor 8 may be as well a detection sensor of a mechanical type, a sonic type, and so on.

The circuit board 9 principally includes circuits of; an output signal detection unit 10, a magnetic data reading unit 20, a magnetic data processing unit 30, a magnetic card detection unit 40, an input switching unit 50, a switch 55, a control unit 60, a main storage unit 70, a subsidiary storage unit 80, an interface unit 90, and the like.

The output signal detection unit 10 is a circuit that receives an analog signal from the magnetic head 6, and detects and makes a judgment on whether the analog signal is a magnetic output of the card 2. The output signal detection unit 10 detects an insertion of the card 2 by the intermediary of the switch 55. Concretely to describe; by the intermediary of the magnetic card detection unit 40, with the front sensor 7 and the rear sensor 8; the output signal detection unit 10 detects that the card 2 has been inserted. Then, in accordance with a detection result on whether or not the analog signal generated from the magnetic head 6 exceeds a threshold value of a magnetic detection sensitivity (hereinafter, called a "slice level"), the output signal detection unit 10 modifies the slice level, and learns about a modified result. The output signal detection unit 10 transmits the learned result to the control unit 60, in order to store the learned result as a learned datum 500 in the subsidiary storage unit 80. Then, the output signal detection unit 10 transmits a card detection signal to the control unit 60. Moreover, the output signal detection unit 10 learns about a noise environment, on the basis of a time-series datum of modifying the slice level. Details of the output signal detection unit 10 are described later.

The magnetic data reading unit 20 is a circuit that receives an analog signal from the magnetic head 6, shapes a waveform, and demodulates the analog signal, in order to create a bit datum as a raw datum of a magnetic datum. Details of the magnetic data reading unit 20 are also described later.

The magnetic data processing unit 30 is a circuit that carries out a magnetic data processing operation for temporarily storing the bit datum of the magnetic datum created by the magnetic data reading unit 20, by way of buffering and the like; and then editing the bit datum and storing the edited datum. Then, the stored datum is read out by the control unit 60, and obtained as a data signal. The datum obtained as a data signal becomes a magnetic datum after demodulation (hereinafter, called a "demodulated datum"), which is transmitted to the higher-level device. Details of the magnetic data processing unit 30 are also described later.

The magnetic card detection unit 40 is a circuit that detects the card 2 having physically been inserted, by use of a detection signal of the front sensor 7 and the rear sensor 8. Specifically to be described, the magnetic card detection unit 40 transmits the detection signal of the front sensor 7 and the rear sensor 8 to the output signal detection unit 10 and the control unit 60. Incidentally, the magnetic card detection unit 40 is also able to obtain a position of the card 2 in the chassis 3, on the basis of the detection signal of the front sensor 7 and the rear sensor 8.

The input switching unit 50 transmits a changeover signal to the switch 55, at a time of having received a wake-up signal from the control unit 60; in order to shift a status of the magnetic head 6 from a standby state to a working state, as explained below.

The switch 55 is a switch for shifting a status of the magnetic head 6 between a standby state and a working state. In the standby state of the magnetic head 6, the switch 55 is connected to a side of the output signal detection unit 10. Under the condition, if the switch 55 receives a wake-up signal from the input switching unit 50, the switch 55 gets connected to a side of the magnetic data reading unit 20. Thus, the switch 55 shifts the status of the magnetic head 6 into a working state. In the working state, an analog signal from the magnetic head 6 is output to the magnetic data reading unit 20 so that reading a magnetic signal is carried out.

The control unit 60 controls reading and writing a magnetic signal in the card reader 1. The control unit 60 is configured with a control means and the like, such as a central processing unit (CPU), and a micro processing unit (MPU). Meanwhile, at a time of having received a card detection signal from the output signal detection unit 10, the control unit 60 makes the input switching unit 50 transmit a wake-up signal to the magnetic head 6. Moreover, while an analog signal is obtained by the magnetic head 6 in the working state, and the signal through the switch 55 is converted into a bit datum in the magnetic data reading unit 20, and the datum is edited by the magnetic data processing unit 30 so as to be stored as a demodulated datum; the control unit 60 obtains the demodulated datum, and transmits the datum to the higher-level device.

In the meantime, the output signal detection unit 10, the magnetic data processing unit 30, the input switching unit 50, the main storage unit 70, the subsidiary storage unit 80, and the interface unit 90 are individually connected to the control unit 60.

The main storage unit 70 is a non-volatile storage medium, such as a random access memory (RAM). A control program for the card reader 1 is read out from the subsidiary storage unit 80 and deployed, and then a temporary datum and the like for executing the control program are stored in the main storage unit 70. Moreover, the main storage unit 70 works as a buffer for temporarily storing information that has been read out from the card 2, or information to be written into the card 2.

The subsidiary storage unit 80 is a non-volatile storage medium, such as a read only memory (ROM), a flash memory, and the like. The subsidiary storage unit 80 stores the control program and a datum. The control program is executed by the control unit 60, for reading out magnetic information recorded in the card 2, and writing magnetic information into the card. Moreover, by means of the control program, it is also possible to decode a magnetic detection signal obtained from the output signal detection unit 10 for creating a decoded datum.

Furthermore, the subsidiary storage unit 80 stores the learned datum 500. In this way, the subsidiary storage unit 80 works as a learned data storage unit. Concretely to describe, the learned datum 500 includes an initial value for a slice level of a comparator 120 (shown in FIG. 3) of the output signal detection unit 10, and a slice level at a termination time of learning operation, which is described later, as a magnetic detection sensitivity setting value. The slice level is a threshold value for making a judgment on whether an analog signal generated from the magnetic head 6 is a noise or a magnetic signal of the card 2.

The interface unit 90 is a communication interface that converts a digital signal, input from a demodulation unit, into a digital signal according to serial or parallel standards, such as standards of RS-232C, Universal Serial Bus (USB), and the like, and outputs the converted signal.

Figure 4:
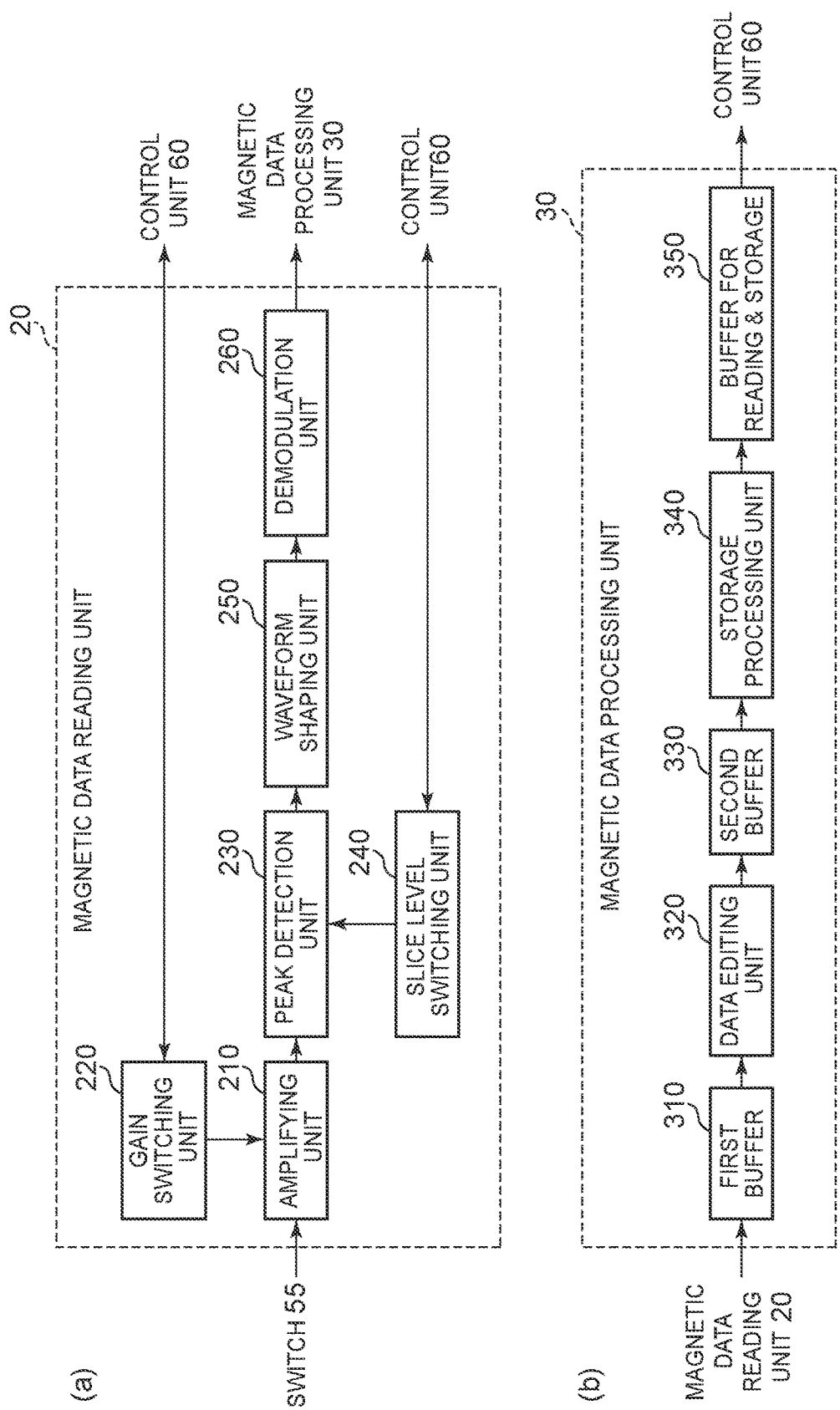
FIG. 4 includes block diagrams showing control configurations of a magnetic data reading unit and a magnetic data processing unit that are shown in FIG. 2

Incidentally, although being not illustrated, the control unit 60 includes a decoding (decoder) unit. It is also possible to configure the decoding unit in such a way as to receive a clock signal and a data signal from a demodulation unit 260 (shown in FIG. 4) of the magnetic data reading unit 20, in order to decode the data signal. Moreover, the main storage unit 70 and the subsidiary storage unit 80 may be configured as a System On Chip (SOC) that is internally built in the control unit 60. Furthermore, a configuration may be made in such a way that, without creating a wake-up signal from the input switching unit 50 by the control unit 60, the switch 55 is connected to the magnetic data reading unit 20 in accordance only with a card detection signal from the output signal detection unit 10, in order to shift a status of the magnetic head 6 to a working state.

[Configuration of Output Signal Detection Unit 10]

Figure 3:
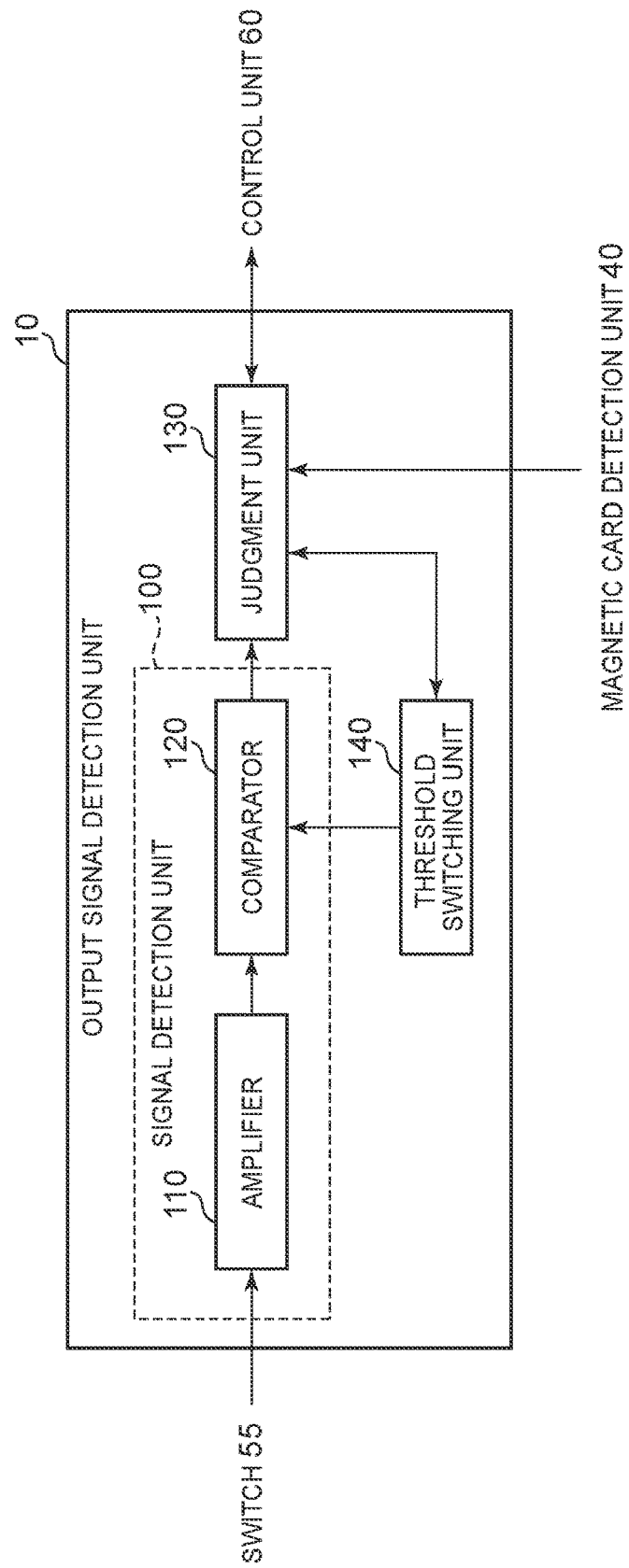
FIG. 3 is a block diagram showing a control configuration of an output signal detection unit shown in FIG. 2

Next, a detailed control configuration of the output signal detection unit 10 is explained with reference to FIG. 3. The output signal detection unit 10 includes a signal detection unit 100, a judgment unit 130, and a threshold switching unit 140.

(Signal Detection Unit 100)

The signal detection unit 100 outputs a detection output signal in the case of obtaining an analog signal exceeding a threshold value, to be described later, from the magnetic head 6.

Concretely to describe, the signal detection unit 100 is configured with an amplifier 110 and a comparator 120. The amplifier 110 amplifies an analog signal reproduced by the magnetic head 6, and shapes a waveform, and then outputs the signal to the comparator 120. The comparator 120 is configured with a comparator element (a comparator) and an electronic switch. For the comparator 120, a slice level is set up by a judgment unit 130 so as to be variable. In other words, in the signal detection unit 100, the amplifier 110 amplifies the analog signal coming from the magnetic head 6, being in the standby state; and then if the signal exceeds the slice level in the comparator 120, a detection output signal is output.

(Judgment Unit 130)

The judgment unit 130 makes a judgment on whether or not the card 2 has actually been inserted, on the basis of an output from the magnetic card detection unit 40 and an output from the signal detection unit 100. For such an operation, the judgment unit 130 is configured with a control means and the like, such as a central processing unit (CPU), and a micro processing unit (MPU). Concretely to describe, in the case where no insertion of the card 2 is detected on the basis of a detection signal coming from the front sensor 7 and/or the rear sensor 8, the detection signal being obtained through the magnetic card detection unit 40; the judgment unit 130 judges that the detection output signal output by the signal detection unit 100 is different from a magnetic signal recorded in the card 2. On the other hand, in the case where insertion of the card 2 is detected on the basis of the detection signal coming from the front sensor 7 and/or the rear sensor 8, and moreover a detection output signal is output by the signal detection unit 100, the judgment unit 130 transmits a card detection signal to the control unit 60. Furthermore, the judgment unit 130 learns about a noise environment that enters the magnetic head 6; and then the judgment unit 130 stores an initial value of a slice level as the learned datum 500, in the subsidiary storage unit 80.

Concretely to describe, the judgment unit 130 tries to obtain a detection signal from the front sensor 7 and a detection signal from the rear sensor 8, by the intermediary of the magnetic card detection unit 40. In the case of obtaining either of the detection signals from the front sensor 7 and the rear sensor 8, the judgment unit 130 judges that the card 2 has been inserted in the chassis 3. In this case, noticing that the card 2 has been inserted, the judgment unit 130 transmits the card detection signal to the control unit 60.

On the other hand, in the case where the judgment unit 130 obtains a detection output signal from the signal detection unit 100 while obtaining neither the detection signal from the front sensor 7 nor the detection signal from the rear sensor 8, the judgment unit 130 judges that the card 2 does not exist in the chassis 3. In this case, the judgment unit 130 judges that the signal from the signal detection unit 100 is a foreign noise. Namely, in the case where a detection output signal is output from the signal detection unit 100 in spite of a judgment that there is no insertion of the card 2, the judgment unit 130 judges that a (foreign magnetic) noise is entering through the magnetic head 6. In this case, the judgment unit 130 notices that there has appeared the detection output signal, even though the card 2 is not inserted; so that, as described below, the judgment unit 130 makes the threshold switching unit 140 modify the slice level of the comparator 120 for learning about a noise environment.

Concretely to describe, in the case of having obtained a detection output signal from the signal detection unit 100 in a state of no presence of the card 2 in the chassis 3, the judgment unit 130 judges that an environment where the card reader 1 is installed has an intense noise. Then, while raising the slice level by one level at a time (in such a way as to lower the magnetic detection sensitivity), the judgment unit 130 makes a judgment again. While having repeated this process, the judgment unit 130 judges that the level has become appropriate for the noise that enters through the magnetic head 6, at a time of having achieved a condition in which no detection output signal is output from the signal detection unit 100; and then the judgment unit 130 outputs the slice level at the time, as a setting value, to the control unit 60. In other words, the judgment unit 130 modifies the slice level in such a way that no detection output signal is output from the signal detection unit 100 in the case of no presence of the card 2. At a time of having received the setting value for the slice level, the control unit 60 stores the value as a setting value of the magnetic detection sensitivity after learning operation, in the learned datum 500 of the subsidiary storage unit 80. Then, the slice level after the learning operation becomes a level which enables reading out in a first reading operation at a time when the card 2 is inserted. Incidentally, it is also possible for the judgment unit 130 to directly store the modified slice level in the learned datum 500 of the subsidiary storage unit 80.

Moreover, in the case where a noise environment that has been learned is almost a constant environment, at a time of reading out or writing in the card 2, the judgment unit 130 modifies the slice level of the comparator 120 by means of the threshold switching unit 140, so as to cope with a setting value for a slice level at a level that enables reading out information recorded in the card 2 in a first reading operation. Incidentally, the judgment unit 130 is also able to change the magnetic detection sensitivity of the threshold switching unit 140 in a sequential order, so as to cope with setting values for a plurality of slice levels with which it is expected that reading operation can be done.

Furthermore, in the case where the learned noise environment is almost not a constant environment, the judgment unit 130 sequentially modifies the slice level of the judgment unit 130, in such a way as to follow a fluctuating noise pattern. According to this operation, a potential for reading out the card 2 by making a follow-up of a noise can be improved.

Incidentally, the judgment unit 130 may also calculate setting values for a plurality of slice levels with which it is expected that reading operation can be done, and may store the setting values in the learned datum 500 of the subsidiary storage unit 80, so as to be included there. Then, in the case where a detection output signal is still output from the signal detection unit 100 even though a slice level is repeatedly raised up to a maximum level; namely, even though the magnetic detection sensitivity is reduced to a minimum, the judgment unit 130 notifies the control unit 60 of the condition as an error.

(Threshold Switching Unit 140)

The threshold switching unit 140 modifies a slice level (a threshold value of the magnetic detection sensitivity) to be set in the comparator element of the comparator 120 by a specific grade (level) unit. In a present case, the threshold switching unit 140 can modify the slice level, for example, by a specific level unit, such as 1 to 4. Namely, explained in the present embodiment is an example in which the slice level can be modified with four levels. Meanwhile, in the present embodiment; when the slice level is low, the magnetic detection sensitivity becomes high. On the other hand; when the slice level is high, the magnetic detection sensitivity becomes low. In other words, at a time when the slice level is low, a detection output signal is output from the signal detection unit 100 even in the case of a small analog signal amplified by the amplifier 110 and coming from the magnetic head 6. In the meantime, at a time when the slice level is high, a detection output signal is not output from the signal detection unit 100 if the analog signal is not great enough.

[Configuration of Magnetic Data Reading Unit 20]

Next, a detailed control configuration of the magnetic data reading unit 20 is explained with reference to FIG. 4A.

The data reading unit 20 is so configured as to include an amplifying unit 210, a gain switching unit 220, a peak detection unit 230, a slice level switching unit 240, a waveform shaping unit 250, and a demodulation unit 260.

(Amplifying Unit 210)

The amplifying unit 210 is a circuit configured with an operation amplifier. The amplifying unit 210 amplifies an analog signal reproduced by the magnetic head 6. Incidentally, the amplifying unit 210 amplifies a magnetic signal by use of an appropriate amplification factor (gain) of magnetic detection sensitivity. The magnetic detection sensitivity of the amplifying unit 210 can be switched to, for example, a high gain and a low gain. Then, the amplifying unit 210 outputs an analog signal (an amplified signal) amplified with the specified magnetic detection sensitivity, to the peak detection unit 230. Incidentally, the amplifying unit 210 may change the gain by a specific gain level unit, such as 1 to 10.

(Gain Switching Unit 220)

The gain switching unit 220 is a circuit for switching the gain of the magnetic detection sensitivity of the amplifying unit 210. The gain switching unit 220 adjusts the gain of the magnetic detection sensitivity of the amplifying unit 210, according to a control from the control unit 60. Concretely to describe, the gain switching unit 220 obtains a gain setting signal coming from the control unit 60. The gain switching unit 220 sets up a gain in accordance with the amplification factor of the gain setting signal, in the amplifying unit 210. The gain switching unit 220 can set a gain, for example, at a first sensitivity that is a high sensitivity, and a second sensitivity that is a low sensitivity. Thus, a voltage of the analog signal, which is obtained by way of the switch 55 and output from the magnetic head 6, is amplified by the amplifying unit 210, by use of the gain set in accordance with the gain setting signal.

(Peak Detection Unit 230)

The peak detection unit 230 detects a peak value of the output signal from the amplifying unit 210, and generates a detection pulse. The peak detection unit 230 outputs an output signal, composed of a row of detection pulses, to the waveform shaping unit 250. The peak detection unit 230 is provided with a peak level detection circuit that demodulates an output into a binary datum, in the case of obtaining the output of a certain level. The peak level detection circuit is configured with a peak detection circuit, and a level detection circuit for reducing false recognition owing to a noise.

More specifically to explain, the card reader 1 according to the present embodiment makes use of an FM method for reading out the card 2. Then, in the peak detection unit 230; while a standard interval is defined with an interval between pulses of peak pulse signals, at a time of a datum with '0' obtained by way of A/D (Analog-to-Digital) conversion of an analog signal, a peak is formed at a part of half the standard interval when the datum is with '1'. The peak level detection circuit of the detection unit 230 detects the formed peak by means of the peak detection circuit, and detects an amplitude of the peak, and then generates a peak pulse signal. At this time, the peak detection circuit of the peak detection unit 230 detects the peak, in accordance with a slice level for peak value detection that is set by the slice level switching unit 240.

Specifically to explain, a waveform of a magnetic output has a peak at a position where a magnetizing direction of a magnetic substance in the magnetic stripe 2*a* of the card 2 is reversed. At the position, the peak detection unit 230 detects and outputs the peak in a voltage waveform of the analog signal obtained by the magnetic head 6. Then, the peak detection unit 230 differentiates the waveform of the analog signal, in order to detect an edge where the peak in the signal ascends or descends.

(Slice Level Switching Unit 240)

The slice level switching unit 240 modifies the slice level, as a threshold value for peak detection by the peak detection unit 230, according to a control from the control unit 60. Then, the slice level switching unit 240 transmits a performance threshold setting signal to the peak detection unit 230. Meanwhile, a comparison is made by the peak detection unit 230, between a voltage corresponding to a threshold value set according to the performance threshold setting signal and a voltage of an output signal from the amplifying unit 210.

(Waveform Shaping Unit 250)

Having obtained the output signal composed of a row of detection pulses of peaks detected by the peak detection unit 230, the waveform shaping unit 250 creates a peak pulse signal in which a pulse is formed at a position where each peak is detected. Concretely to describe, the waveform shaping unit 250 creates an F2F signal being waveform-shaped, as the peak pulse signal. In other words, the waveform shaping unit 250 modulates the output signal into an F2F modulated datum in which a pulse is placed at a center of clock timing in the case of logical "1"; and a pulse is placed at a center of clock timing in the case of logical "0", on the basis of a supplied clock which is not illustrated. More concretely to describe, the waveform shaping unit 250 counts a reference time width 'T' having a bit "0" according to the clock, and creates a data discrimination signal with a time width of '5/7T'. Then, the waveform shaping unit 250 outputs the peak pulse signal to the demodulation unit 260.

(Demodulation Unit 260)

The demodulation unit 260 obtains the peak pulse signal output from the waveform shaping unit 250, and demodulates the magnetic information, and then transmits a demodulated datum as a bit datum, to the magnetic data processing unit 30. Concretely to describe, the demodulation unit 260 measures an interval between every two pulses of the peak pulse signal, in order to demodulate the peak pulse signal, on the basis of a predetermined rule, and read out the magnetic information of "1" or "0" to convert the magnetic information into a bit datum (a raw datum). In other words, the F2F signal coming from the waveform shaping unit 250 is demodulated into a digital signal in the demodulation unit 260. More concretely to describe, the demodulation unit 260 judges, with reference to the discrimination signal, that a next bit represents "0" if there exists neither ascending nor descending of a next bit of the F2F signal within a range of '5/7T'; and meanwhile a next bit represents "1" if there exists either ascending or descending of the next bit of the F2F signal. Incidentally, an output from the demodulation unit 260 is delayed for one bit, with respect to the F2F signal.

[Configuration of Magnetic Data Processing Unit 30]

Next, a detailed control configuration of the magnetic data processing unit 30 is explained with reference to FIG. 4B.

The magnetic data processing unit 30 is so configured as to include a first buffer 310, a data editing unit 320, a second buffer 330, a storage processing unit 340, and a buffer for reading & storage 350.

The first buffer 310 is a buffer that stores the bit datum received from the demodulation unit 260 of the magnetic data processing unit 30, as is un-edited.

The data editing unit 320 is a circuit for editing the bit datum stored in the first buffer 310. Concretely to describe, as an editing process by the data editing unit 320; usually on the basis of a specification for recording prescribed in JIS X6302, a "start symbol" for synchronization is searched in the bit datum, and then a character up to an "end symbol" and an "LRC" is segmented with respect to each character. At the time of segmenting a character, it is also possible for the data editing unit 320 to execute a character data check (a validity check). The data editing unit 320 outputs a check result as an error detection datum. Incidentally, any process other than those described above may be carried out, as an editing process.

The second buffer 330 is a buffer for storing a datum edited by the data editing unit 320.

The storage processing unit 340 is a circuit that carries out a storing process for a datum stored in the second buffer 330. In the storing process by the storage processing unit 340, usually all data from a "start symbol" to an "end symbol" and an "LRC" with respect to each datum are stored in the buffer for reading & storage 350. Namely, in this storage processing, mainly a datum read out is copied.

The buffer for reading & storage 350 is a buffer that stores a datum for which the storage processing is carried out by the storage processing unit 340. The control unit 60 detects a storing process of the datum to the buffer for reading & storage 350, and then the stored datum is read out and obtained as a data signal.

Incidentally, the magnetic data processing unit 30 may transmits the stored datum, as a data signal, to the main storage unit 70, by means of Direct Memory Access (DMA) and the like.

[Card Reader Operation Process]

Next, a card reader operation process by the card reader 1 according to the embodiment of the present invention is explained with reference to FIG. 5.

The output signal detection unit 10 and the control unit 60 of the card reader 1 deploy the control program, being stored in the subsidiary storage unit 80, in the main storage unit 70; and then execute the card reader operation process by use of hardware resources, in cooperation with each unit. Incidentally, the output signal detection unit 10 may execute a process described below, by way of executing a control program stored in a built-in ROM and the like.

(Step S101)

Figure 6:
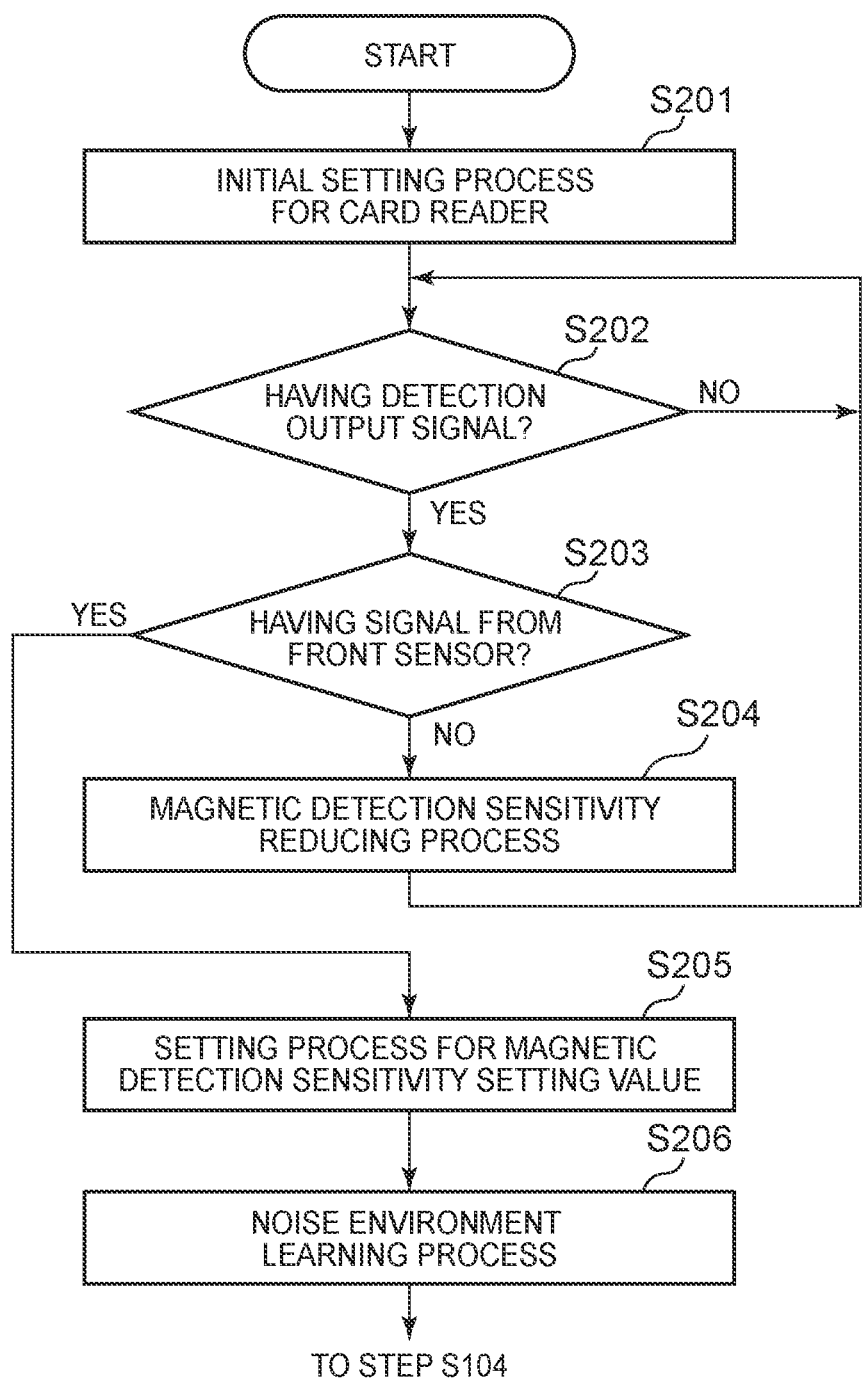
FIG. 6 is a flowchart of a magnetic detection sensitivity setting process shown in FIG. 5.

At first, the control unit 60 judges whether or not it is needed to set an initial value for a slice level. The control unit 60 makes a judgment with 'Yes' that it is needed to set the initial value for a slice level, for example, in the case where the card reader 1 is installed in a higher-level device and a power source of the card reader 1 is turned on, or reset. Moreover, the control unit 60 also makes a judgment with 'Yes', in the case where a noise environment has changed in a state of waiting for insertion of the card 2 and the like, after starting operation of the card reader 1. Furthermore, the control unit 60 also makes a judgment with 'Yes', in the case of having received an instruction signal from the higher-level device, or in the case where an instruction of resetting and the like is issued from a user by means of a switch and the like, being not illustrated, with which the card reader 1 is provided. In any other case, the control unit 60 makes a judgment with 'No', because there is no need to set the initial value for a slice level. In the case of 'Yes', the control unit 60 moves operation forward to Step S102. On the other hand, in the case of 'No', the control unit 60 moves operation forward to Step S103.
(Step S102)
If it is needed to set an initial value for a slice level, the control unit 60 and the output signal detection unit 10 carry out a magnetic detection sensitivity setting process. The control unit 60 makes the output signal detection unit 10 modify the slice level by one level unit, in order to learn about the noise environment and obtain a setting value. Then, the output signal detection unit 10 saves the setting value for a slice level after the modification, as the initial value for a slice level, in the learned datum 500 of the subsidiary storage unit 80. Moreover, the output signal detection unit 10 transmits a card detection signal to the control unit 60. Details of the magnetic detection sensitivity setting process are described later.
(Step S103)
If it is not needed to set an initial value for a slice level, the control unit 60 and the output signal detection unit 10 carry out a card reading start-up process. The control unit 60 makes the output signal detection unit 10 further adjust the slice level, on the basis of the setting value for a slice level that has been set. Details of the card reading process are also described later.
(Step S104)
At this time, the control unit 60 carries out a switching process. The control unit 60 transmits a wake-up signal to the input switching unit 50. Then, the switch 55 is switched by the input switching unit 50 so that the magnetic head 6 shifts its status from a standby state to a working state.
(Step S105)
Next, the control unit 60 carries out a magnetic data reading output process. The control unit 60 reads out a datum of the card 2 as a data signal, and obtains the datum as a demodulated datum; wherein the datum of the card 2 being read out through the magnetic head 6, and being input into the magnetic data reading unit 20 by the intermediary of the switch 55 so as to be converted into a bit datum in the magnetic data reading unit 20 and output therefrom, and being edited by the magnetic data processing unit 30 so as to be stored. The control unit 60 once stores the demodulated datum, which has been obtained, in the main storage unit 70; and then outputs the datum to the higher-level device. The demodulated datum contains an error detection datum to be described later. The card reader operation process according to the embodiment of the present invention terminates at this point, as described above.
[Magnetic Detection Sensitivity Setting Process]
Next, details of a magnetic detection sensitivity setting process by the card reader 1 according to the embodiment of the present invention are explained with reference to FIG. 6.
In the magnetic detection sensitivity setting process according to the present embodiment; if a level of a signal input from the magnetic head 6 is equal to or higher than the slice level, the output signal detection unit 10 judges that the signal is a magnetic signal, so as to output a magnetic detection signal. Then, if the magnetic detection signal is output in a state where the card 2 is not inserted, there is made a judgment that the environment for installation has an intense noise, so as to raise the slice level; namely, in such a way as to lower the magnetic detection sensitivity. This process is repeated, and at a time of having a state where no magnetic detection signal is output, there is made a judgment that an effect of the noise entering through the magnetic head 6 has been eliminated, so as to determine a setting value for the magnetic detection sensitivity. Thus, in a state where the card 2 does not exist, countermeasures are taken against the foreign noise in order to have a state of no magnetic detection signal being output, so as to specify the setting value for the magnetic detection sensitivity with which the effect of the noise is controlled for sure. The magnetic detection sensitivity setting process according to the present embodiment is executed mainly by means of the output signal detection unit 10 and the control unit 60, in cooperation with each unit, by use of hardware resources.
(Explanation of Operation)
With reference to the flowchart in FIG. 6, the magnetic detection sensitivity setting process according to the present embodiment is explained below with respect to each step.
(Step S201)
If a power source of the card reader 1 is turned on, the judgment unit 130 of the output signal detection unit 10 carries out an initial setting process for the card reader. At a time of start-up when the power source is turned on, the magnetic head 6 is connected to the output signal detection unit 10 by the intermediary of the switch 55, and gets into a standby state. In the meantime, a slice level of the comparator 120 of the output signal detection unit 10 becomes '1' that is a minimum level. In other words, the magnetic detection sensitivity becomes maximized. Then, the judgment unit 130 sets up the slice level, which is set in the learned datum 500 of the subsidiary storage unit 80 by the intermediary of the control unit 60, in the comparator 120 by use of the threshold switching unit 140.
(Step S202)
Then, the judgment unit 130 of the output signal detection unit 10 stands by until it obtains a detection output signal. The judgment unit 130 stays in a standby state until the card 2 is inserted, after having set the threshold value in the comparator 120. In other words, the judgment unit 130 keeps on standing by, as far as an output signal from the magnetic head 6 does not exceed the threshold value so that no detection output signal is output from the signal detection unit 100 (at Step S202: No). On the other hand, if a detection output signal is output from the signal detection unit 100 (at Step S202: Yes), the judgment unit 130 moves operation forward to Step S203.
(Step S203)
At this point, the judgment unit 130 of the output signal detection unit 10 judges whether or not there exists a signal from the front sensor and the like. In the case of having detected a detection signal from either the front sensor 7 or the rear sensor 8 through the intermediary of the magnetic card detection unit 40, the judgment unit 130 makes a judgment with 'Yes'. Meanwhile, in the case of having detected no detection signal from both the front sensor 7 and the rear sensor 8, the output signal detection unit 10 makes a judgment with 'No'. In the case of the judgment with 'Yes', the judgment unit 130 moves operation forward to Step S205. Meanwhile, in the case of the judgment with 'No', the judgment unit 130 moves operation forward to Step S204.
(Step S204)
In the case of having detected no detection signal from the front sensor 7 and the rear sensor 8 even having the detection output signal from the signal detection unit 100, the judgment unit 130 carries out a magnetic detection sensitivity reducing process. In this case, the judgment unit 130 judges that the card 2 is not inserted in the card reader 1 (no card exists there), and a noise is entering through the magnetic head 6. Thus, the judgment unit 130 modifies the slice level of the comparator 120 in order to raise it by one level (in such a way as to lower the magnetic detection sensitivity), by use of the threshold switching unit 140. Then, the judgment unit 130 returns operation to Step S202, and continues the step of determining whether there exists a detection output signal.

Incidentally, the judgment unit 130 may notifies the control unit 60 of an error if the slice level is already at the maximum level (i.e., the magnetic detection sensitivity is at a minimum) at this step.

(Step S205)

In the case of no magnetic detection signal resulting from a noise, the judgment unit 130 and the control unit 60 carries out a setting process for a magnetic detection sensitivity setting value. As described above; since there exists the detection output signal coming from the signal detection unit 100, and meanwhile a detection signal is output from either the front sensor 7 or the rear sensor 8 through the intermediary of the magnetic card detection unit 40, the judgment unit 130 makes a judgment that the card 2 is inserted in the card reader 1 (there exists the card 2). Therefore, the judgment unit 130 judges that a level of the slice level that has been modified is an appropriate level with which no magnetic detection signal resulting from a noise is output; and outputs the slice level that has been modified, to the control unit 60. Then, the control unit 60 stores the slice level, as a magnetic detection sensitivity setting value, in the learned datum 500 of the subsidiary storage unit 80. The magnetic detection sensitivity setting value becomes a reference value for a reading judgment, and it becomes a value indicating the magnetic detection sensitivity at the level that makes it possible to read information recorded in the card 2 at a first reading operation. Incidentally, the judgment unit 130 may estimate a plurality of magnetic detection sensitivity setting values with which it is considered that the card 2 can be read even if the slice level is further raised, and also store those values in the learned datum 500.

(Step S206)

Next, the judgment unit 130 carries out a noise environment learning process. The judgment unit 130 learns about a noise environment, while aiming at a routine noise. Concretely to describe; if there is no output from the front sensor 7 and the rear sensor 8 by the intermediary of the magnetic card detection unit 40, the judgment unit 130 raises a slice level by one level at a time from a lowest level, at specific intervals of about several micro seconds to several seconds, in order to obtain a level with which no detection output signal is output from the signal detection unit 100, a plurality of times; and then records the level as a learned result in the learned datum 500 of the subsidiary storage unit 80. Moreover, the judgment unit 130 analyzes a time-series datum of a slice level in a specific period, which shows the learned result that has been recorded. In the case where a noise level changes within a range lower than a specific threshold value, the judgment unit 130 judges that the noise is almost constant in the environment. Meanwhile, if the noise is almost not constant in the environment, the judgment unit 130 may recognize a pattern of the noise level in this learning operation. The magnetic detection sensitivity setting process according to the embodiment of the present invention terminates at this point, as described above; and then the control unit 60 moves operation forward to the switching process of Step S104 (shown in FIG. 5).

[Card Reading Start-Up Process]

Figure 5:
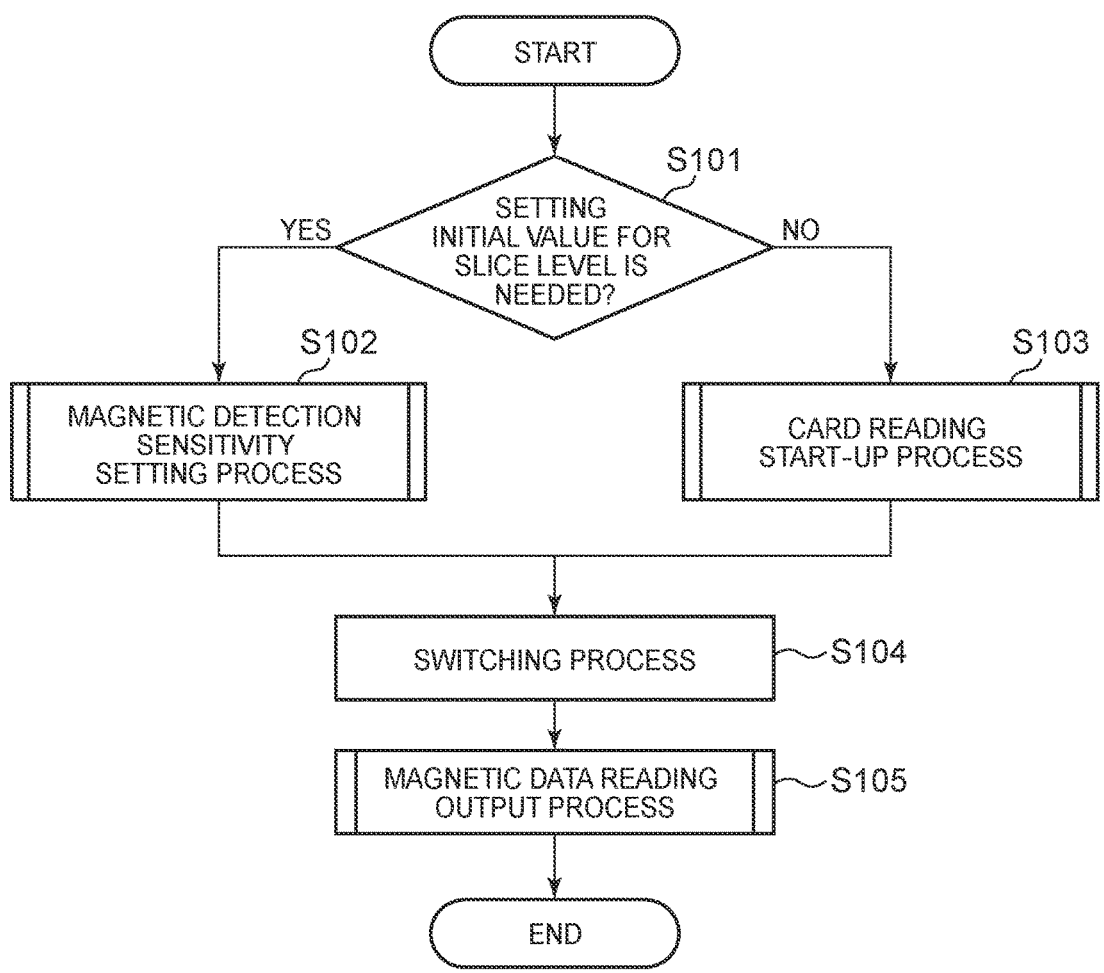
FIG. 5 is a flowchart of a card reader operation process according to the embodiment of the present invention.

Next, details of the card reading start-up process shown as Step S103 in FIG. 5 are explained with reference to FIG. 7.

(Step S301)

At first, the output signal detection unit 10 carries out a magnetic detection sensitivity level constant-setting process. Depending on a noise environment around the magnetic head 6, the output signal detection unit 10 sets a slice level again. Details of the magnetic detection sensitivity level constant-setting process are described later.

(Step S302)

Next, the control unit 60 obtains a detection signal from the front sensor 7 through the intermediary of the magnetic card detection unit 40, and judges whether a card insertion into the insertion slot 4 has been detected at the front detection mechanism. In the case of no detection signal from the front sensor 7 (at Step S302: No), the control unit 60 stands by.

(Step S303)

In such a state, if a card insertion into the insertion slot 4 is once detected (at Step S302: Yes), the control unit 60 carries out a magnet data reading start-up process. The control unit 60 makes the magnetic data reading unit 20 and the magnetic data processing unit 30 start reading a magnetic datum recorded in the card 2, by the way of the magnetic head 6.

The card reading start-up process according to the embodiment of the present invention terminates at this point, as described above; and then the control unit 60 moves operation forward to the switching process of Step S104 (shown in FIG. 5).

[Magnetic Detection Sensitivity Level Constant-setting Process]

Figure 7:
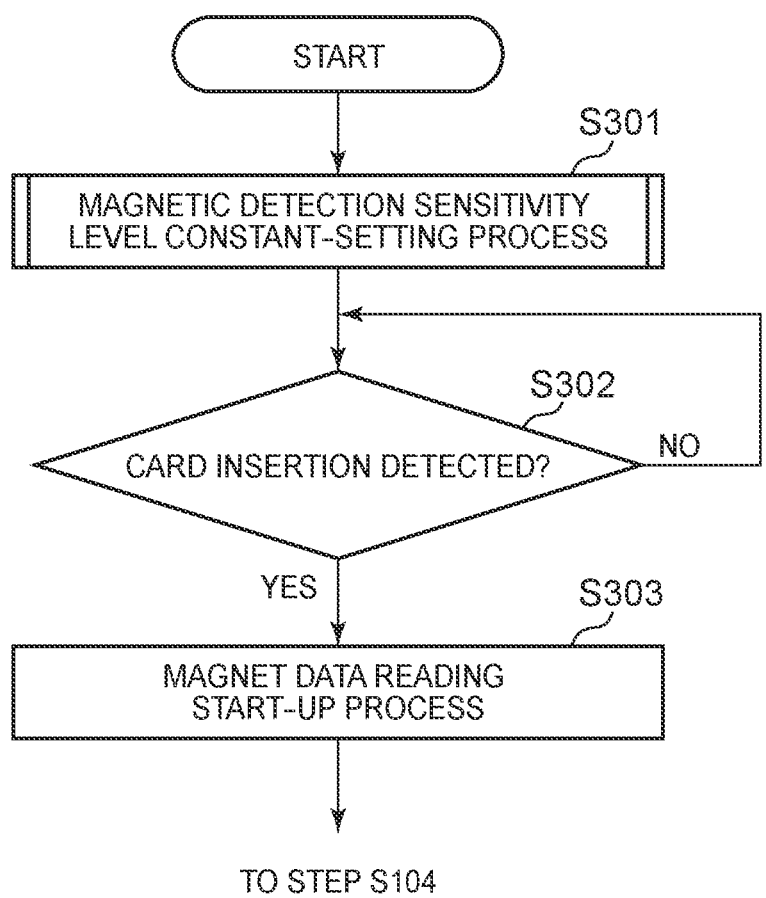
FIG. 7 is a flowchart of a card reading start-up process shown in FIG. 5.
Figure 8:
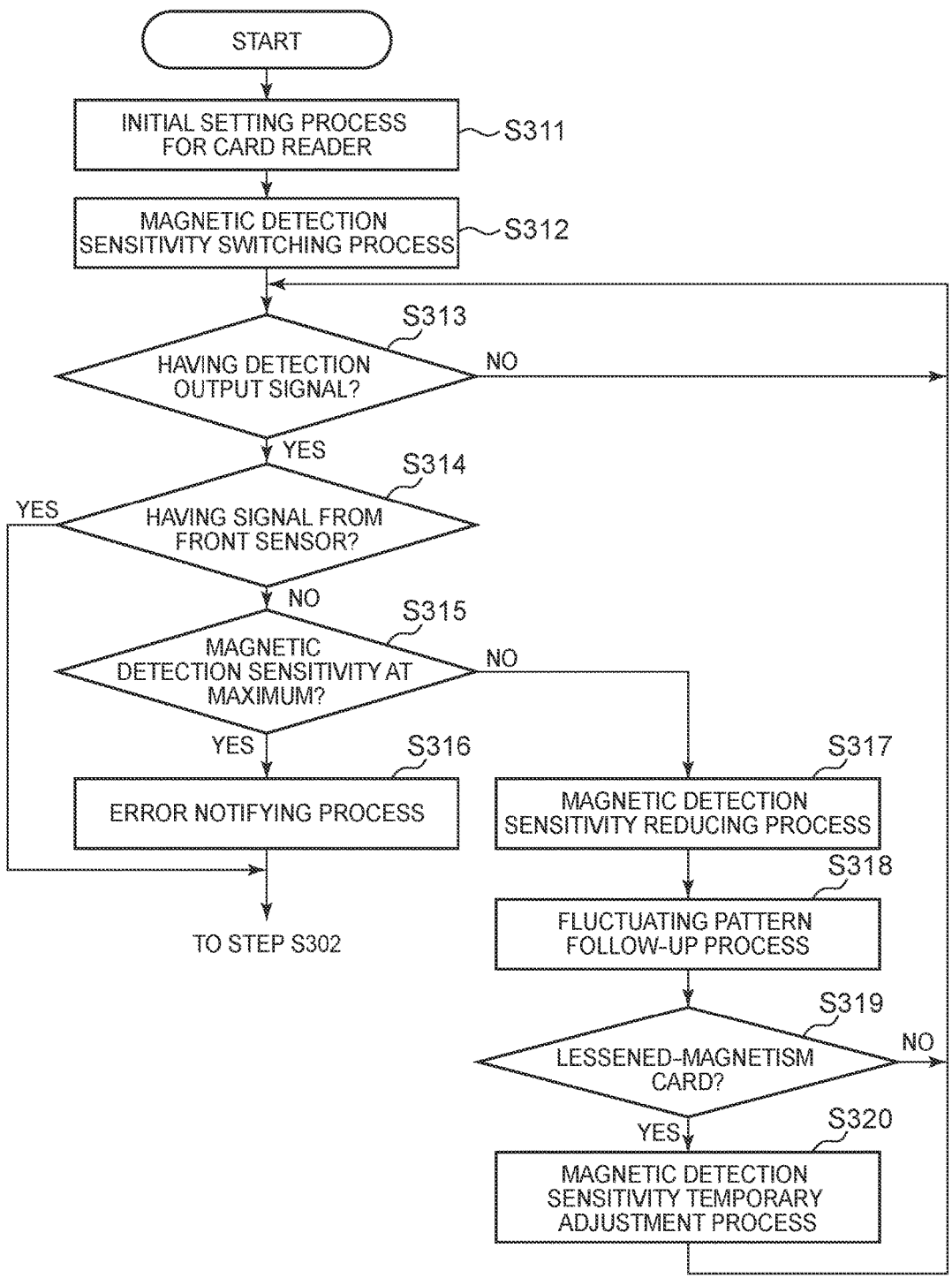
FIG. 8 is a flowchart of a magnetic detection sensitivity level constant-setting process shown in FIG. 7.

Next, the magnetic detection sensitivity level constant-setting process, shown as Step S301 in FIG. 7, is explained with reference to FIG. 8.

In the magnetic detection sensitivity level constant-setting process according to the present embodiment; if a noise environment does not stay constant, or magnetism is lessened in the magnetic stripe 2a of the card 2 so as to have a lessened magnetic signal, the output signal detection unit 10 sets a slice level again on the basis of the noise environment learned in the magnetic detection sensitivity setting process (shown in FIG. 5 and FIG. 6) described above. The magnetic detection sensitivity level constant-setting process according to the present embodiment is explained below with reference to a flowchart of FIG. 8.

(Step S311)

At first, the judgment unit 130 of the output signal detection unit 10 carries out the initial setting process for the card reader. The process is carried out in the same way as it is in Step S201 (shown in FIG. 6).

(Step S312)

Next, the judgment unit 130 carries out a magnetic detection sensitivity switching process. In this process, the judgment unit 130 reads out a magnetic detection sensitivity setting value, which has been set in the learned datum 500 of the subsidiary storage unit 80, by the intermediary of the control unit 60; and makes the threshold switching unit 140 switch the slice level of the comparator 120 to a level corresponding to the magnetic detection sensitivity setting value. As described above, the magnetic detection sensitivity setting value has been specified, on the basis of the learned noise environment, so as to be a most appropriate reading sensitivity, and in such a way as to make it possible to read the card 2 at a first reading operation.

(Step S313)

Next, in the case of having obtained no detection output signal (at Step S313: No), the judgment unit 130 stands by. This process is also carried out in the same way as it is in Step S202 (refer to FIG. 6). Meanwhile, in the case of having obtained a detection output signal (at Step S313: Yes), the judgment unit 130 moves operation forward to Step S314.

(Step S314)

At this point, the judgment unit 130 detects a presence of a detection signal from the front sensor 7. In the case of having detected a detection signal from the front sensor 7 through the intermediary of the magnetic card detection unit 40, the judgment unit 130 makes a judgment with 'Yes'. On the other hand, in the case of having detected no detection signal from the front sensor 7, the output signal detection unit 10 makes a judgment with 'No'. In the case of the judgment with 'Yes', the judgment unit 130 terminates the magnetic detection sensitivity level constant-setting process, and moves operation forward to Step S302 (refer to FIG. 7). In the case of the judgment with 'No', the judgment unit 130 moves operation forward to Step S315.

(Step S315)

In the case of having detected no detection signal from the front sensor 7, the judgment unit 130 judges whether the magnetic detection sensitivity is at a maximum or not. On this occasion, if the magnetic detection sensitivity is at a maximum, namely, the slice level is at a minimum level, the judgment unit 130 makes a judgment with 'Yes'. Otherwise, the output signal detection unit 10 makes a judgment with 'No'. In the case of 'Yes', the judgment unit 130 moves operation forward to Step S316. Meanwhile, in the case of 'No', the judgment unit 130 moves operation forward to Step S317.

(Step S316)

In the case where the slice level is already at a minimum level (namely, the magnetic detection sensitivity is at a maximum), the judgment unit 130 carries out an error notifying process. On this occasion, the judgment unit 130 terminates the magnetic detection sensitivity level constant-setting process, and notifies the control unit 60 of an error. Having received this notification, the control unit 60 notifies the higher-level device of an error in reading the card 2, in order to make an error indication and the like. Then, the judgment unit 130 terminates the magnetic detection sensitivity level constant-setting process, and moves operation forward to Step S302 (refer to FIG. 7).

(Step S317)

In the case where the slice level is not at a minimum level (namely, the magnetic detection sensitivity is lower than the maximum), the judgment unit 130 carries out a magnetic detection sensitivity reducing process. The judgment unit 130 raises the slice level of the comparator 120 (in such a way as to reduce the magnetic detection sensitivity) by using the threshold switching unit 140. Incidentally, if there exist a plurality of magnetic detection sensitivity setting values specified in the learned datum 500, the judgment unit 130 may sequentially change the level of the slice level, corresponding to the magnetic detection sensitivity setting value, in an order of having a higher potential for reading the card 2, instead of simply modifying the slice level of the comparator 120.

(Step S318)

At this point, the judgment unit 130 carries out a fluctuating pattern follow-up process. In the case where it is recorded, as a result of the noise environment learning process described above, in the learned datum 500 that the noise is almost not constant and the environment has an intense fluctuation, the judgment unit 130 makes the slice level follow up the noise fluctuation pattern. In other words, the judgment unit 130 changes the level of the slice level of the comparator 120 in real time (real-time-wise), by means of the threshold switching unit 140, on the basis of the time-series datum recorded in the learned datum 500. On this occasion, in the case where a foreign noise increases so as to have an effect on reading operation while the card 2 is not inserted, the judgment unit 130 modifies the slice level in such a way as to make the adjustment by one level at a time. Nevertheless, the judgment unit 130 makes a judgment in such a way as not to excessively change the slice level on a large scale, so as to still secure a reading margin for a lessened-magnetism card that has a lessened magnetic signal in the magnetic stripe 2a.

More concretely to explain, the judgment unit 130 does not change the slice level within a specific period, at a time of an unexpected noise; for example, in the case where a mobile phone approaches, and the like. This is because, a reckless follow-up results in a damage on a reading margin for a lessened-magnetism card. Therefore, the judgment unit 130 carries out the follow-up process in an appropriate period; and after once having changed the magnetic detection sensitivity to a level with which a noise is not regularly detected, the follow-up is moderately carried out at intervals of several seconds to several tens of seconds, generally in a similar way as for a case having a constant noise environment as described above.

(Step S319)

Next, the judgment unit 130 judges whether or not the card 2 is a lessened-magnetism card. In the case of a failure in a first reading operation, the judgment unit 130 refers to an error detection datum stored in the main storage unit 70 by the control unit 60, through the intermediary of the control unit 60. The error detection datum is, for example, a checksum, a hash value, and the like; included in a demodulated datum of a reading step the last time, for judging whether or not information stored in the card 2 has properly been read out. Then, in the case where the information of the card 2 has not properly been read out, the judgment unit 130 notices that the card 2 is a lessened-magnetism card that cannot be read out with the changed magnetic detection sensitivity, and makes a judgment with 'Yes'. On the other hand, in the case where the information of the card 2 has properly been read out, the judgment unit 130 makes a judgment with 'No', since the card 2 is not a lessened-magnetism card. In the case of the judgment with 'Yes', the judgment unit 130 moves operation forward to Step S320. Meanwhile, in the case of the judgment with 'No', the judgment unit 130 returns operation to Step S313.

(Step S320)

In the case of the card 2 being a lessened-magnetism card, the judgment unit 130 carries out a magnetic detection sensitivity temporary adjustment process. The judgment unit 130 temporarily adjusts a level of the slice level of the comparator 120, by using the threshold switching unit 140, for making it easy to read a magnetic signal of the card 2. Specifically to explain; a magnetic signal of the card 2 is usually large enough in comparison with a noise, and therefore it can be read out even when the slice level is raised (namely, to lower the magnetic detection sensitivity). In the meantime, unfortunately a reading margin for a lessened-magnetism card is lowered if the level of the slice level of the comparator 120 is changed to a higher level. Therefore, the judgment unit 130 makes a temporary adjustment in such a way as to temporarily lower the level of the slice level (namely, to raise the magnetic detection sensitivity). Thus, a potential for reading a magnetic signal can be improved even in the case of the card 2 being a lessened-magnetism card. Then, subsequently the judgment unit 130 returns operation to Step S313, and waits for detecting a detection output signal by the signal detection unit 100. The magnetic detection sensitivity level constant-setting process according to the embodiment of the present invention terminates at this point, as described above.

[Magnetic Data Reading Output Process]

Figure 9:
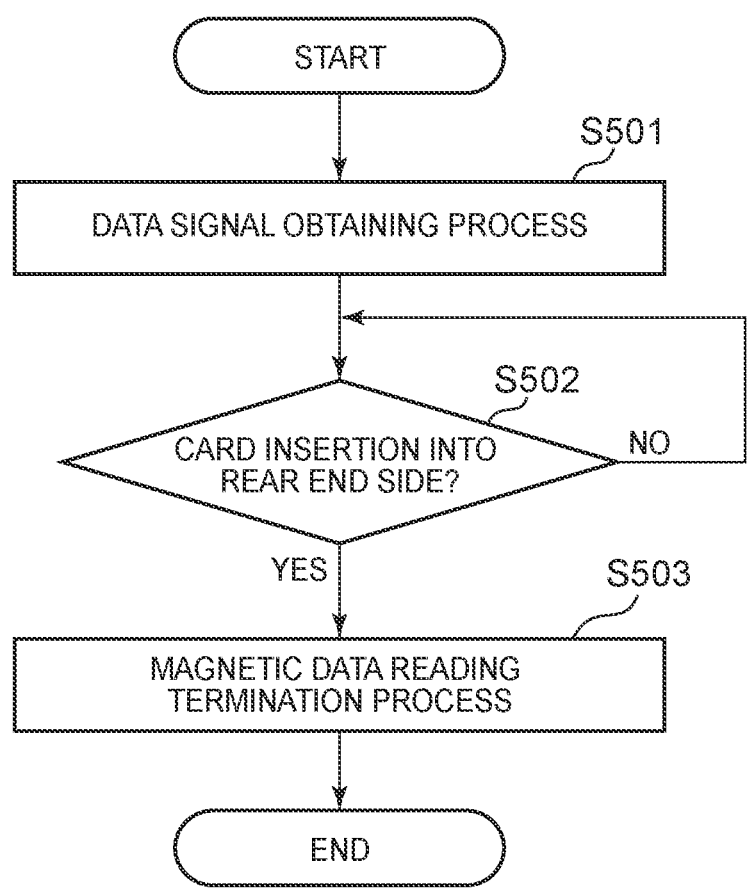
FIG. 9 is a flowchart of a magnetic data reading output process shown in FIG. 5.

Next, details of the magnetic data reading output process shown as Step S105 in FIG. 5 are explained with reference to FIG. 9.

(Step S501)

The control unit 60 carries out a data signal obtaining process. The control unit 60 obtains a data signal that has been processed by the magnetic data reading unit 20 and the magnetic data processing unit 30. The control unit 60 stores the data signal, which has been obtained, as a decoded datum into the main storage unit 70.

Specifically to describe; if once the card 2 is inserted into the cutout part 5 through the insertion slot 4, a datum recorded in the magnetic stripe 2*a* of the card 2 is read out by the magnetic head 6, and processed by the magnetic data reading unit 20; and then the datum is stored as a bit datum into a buffer of the magnetic data processing unit 30. The magnetic data processing unit 30 edits the bit datum that has been stored after being read out. The control unit 60 obtains a datum after the edit, as a data signal; and then temporarily stores the data signal in the main storage unit 70, as a demodulated datum to be transmitted to the higher-level device. Incidentally, the demodulated datum to be transmitted contains the error detection datum previously described.

(Step S502)

Then, the control unit 60 judges whether or not an insertion of the card 2 into the rear end side of the card reader 1 has been detected, on the basis of an output signal from the rear sensor 8. The control unit 60 stands by, in the case of no detection signal from the rear sensor 8 (at Step S502: No).

(Step S503)

In the case where the insertion of the card 2 into the rear end side of the card reader 1 has been detected (at Step S502: Yes), the control unit 60 carries out a magnetic data reading termination process. On this occasion, while the card 2 arrives at a predetermined position in such a way as to be detected by the rear sensor 8 in the card reader 1, the control unit 60 terminates operation of reading a magnetic signal of the card 2 by use of the magnetic head 6; and transmits a normal insertion signal to the higher-level device, the normal insertion signal notifying that the card 2 has normally been inserted. The control unit 60 transmits the normal insertion signal to the higher-level device, for example, by the intermediary of the interface unit 90. Then, the control unit 60 transmits the demodulated datum to the higher-level device.

In this way, the card reader 1 according to the present embodiment keeps the demodulated datum inside the card reader 1, until the higher-level device accepts the datum, in order to certainly transmit the demodulated datum read out from the card 2, to the higher-level device. Then, after the rear sensor 8 detects the arrival of the card 2 at the predetermined position, the arrival being one of conditions for transmitting the datum to the higher-level device; and furthermore after the datum is transmitted to the higher-level device; the control unit 60 erases the demodulated datum out of the main storage unit 70. Incidentally, the control unit 60 may erase the demodulated datum, after receiving an elimination command from the higher-level device.

The higher-level device makes a predetermined display unit and the like show an instruction to prompt a user to pull back the card 2 from the card reader 1, for example, if once the normal insertion signal and the data signal are once input. The magnetic data reading output process according to the embodiment of the present invention terminates at this point, as described above.

[Primary Advantageous Effect of the Embodiment of the Present Invention]

The configuration as described above makes it possible to obtain the following effects:

Conventionally, there exists a card reader that can read a magnetic datum of a card; while the card, such as a bank cash card, a credit card, and the like being manually transferred. Such a conventional card reader does not have a configuration in which a magnetic detection sensitivity is variable in accordance with a noise entering through a magnetic head. Therefore, in the case where a noise is intense around a unit in which the card reader is mounted, there is a potential risk of a reading error on a magnetic card caused by a foreign noise. Particularly in these years, devices generating an intense noise, such as a mobile phone, a security gate, and the like are widespread. Accordingly, in an environment where a foreign noise coming from these devices entirely exceeds an adjustable range of a slice level, a reading error happens so frequently that it becomes impossible to read the card.

In the meantime, the card reader 1 according to the embodiment of the present invention includes: the magnetic card detection unit 40 for detecting the card 2 having been inserted, by use of at least one of the front sensor 7 and the rear sensor 8; the magnetic head 6 for reading a magnetic signal recorded in the card 2, and outputting the magnetic signal as an analog signal; the signal detection unit 100 having the amplifier 110 for amplifying the analog signal output from the magnetic head 6, and the comparator 120 for outputting a detection output signal in the case of the analog signal exceeding a slice level that has been set; and the judgment unit 130 for judging that the detection output signal output by the signal detection unit 100 is different from the magnetic signal recorded in the card 2, in the case where no insertion of the card 2 is detected by the magnetic card detection unit 40. By making a configuration in this way, it becomes possible to surely discriminate between a magnetic signal and a noise so that a false performance can be controlled. In other words, it becomes possible to determine a noise, in accordance with a noise environment of a location where the card reader 1 is installed; and to avoid an error of reading magnetic information. Thus, even in an environment having a lot of noise, information stored in the card 2 can be read out for sure. Namely, without inserting/pulling back the card 2 into/from the card reader 1 several times by a user, a potential for reading out the information of the card 2 at a first reading operation with no error can be improved.

Meanwhile, the card reader 1 according to the embodiment of the present invention is a manual card reader, with which the magnetic signal recorded in the card 2 is read out at a time when a user manually inserts the card 2 into an internal section of a device of the card reader 1, and pulls back the card 2 from the internal section of the device. By making a configuration in this way, a false performance can be controlled, and a processing efficiency can be improved.

Moreover, being different from a device of a motor type, most of conventional manual card readers are not able to voluntarily carry out retrying operation. Then, only a few of them can change a sensitivity among several choices for reading a magnetic signal. Furthermore, even having a function of changing a sensitivity among several choices for reading a magnetic signal, as a conventional card reader, there exist only a few conventional manual card readers that can slightly change a sensitivity and the like, in order to improve a potential of reading performance in relation to a lessened magnetism of a magnetic stripe. In other words, a conventional card reader having an improved possibility of reading a lessened-magnetism card makes a slight adjustment for a magnetically-read actual waveform at a time of reading a magnetic signal, in order to improve a reading performance in general. Namely, these conventional card readers do not have a configuration in which a threshold value of a magnetic detection sensitivity is variable in response to a foreign noise entering through the magnetic head 6. Therefore, in the case of such a conventional card reader; if a noise level is high in a surrounding environment so that a foreign noise enters through the magnetic head 6, the foreign noise inevitably generates a reading error on a magnetic card.

Meanwhile, in the card reader 1 according to the embodiment of the present invention, the judgment unit 130 learns about a noise environment that enters the magnetic head 6; and the judgment unit 130 stores an initial value of a slice level as a learned datum. By making a configuration in this way, the card reader 1 according to the present embodiment sets a level of a magnetic detection sensitivity in the noise environment at a time when the card 2 is not inserted; and then after the setting process, a slice level is changed to the level so as to amplify a magnetic signal of the card 2. Therefore, it becomes possible to certainly reduce a risk of a reading error on the card 2.

Moreover, in the card reader 1 according to the embodiment of the present invention, a slice level to be set in the comparator 120 of the signal detection unit 100 is variable, and there is provided the threshold switching unit 140 for changing the magnetic detection sensitivity. Namely, in the case of the card reader 1 according to the present embodiment, if a magnetic detection signal is output while the card 2 is not transferred at a time of installing the card reader 1, it is judged that a noise is entering through the magnetic head 6, and then the slice level as a threshold value for the magnetic detection sensitivity is modified. Accordingly, by way of changing the magnetic detection sensitivity in accordance with a noise level in the environment for installation, an anti-noise performance can be improved. In other words, it becomes possible to avoid a reading error on a magnetic card owing to a foreign noise. Moreover, at a time of improving the anti-noise performance, there exists only less chance of a need for modifying a hardware structure and changing a component to be surface-mounted on a circuit board, and such an improvement can be materialized largely by a modification on software so that cost saving can be achieved.

Moreover, in the card reader 1 according to the embodiment of the present invention, the judgment unit 130 modifies the slice level of the comparator 120 of the signal detection unit 100 by way of the threshold switching unit 140, in the case of a lessened magnetic signal recorded in the card 2. By making a configuration in this way; a potential of reading performance can be improved by temporarily adjusting the slice level, in the case where a lessened-magnetism card is inserted as the card 2. As a result of that, a potential of reading performance ability can be improved regardless of a state of the card 2, even in an environment having a lot of noise. In other words; by temporarily adjusting the slice level, it becomes still possible to avoid situations where the card 2 cannot be read out at all, and to maintain a normal reading performance as far as possible, in a state where the magnetic detection sensitivity is lowered in a degree with no effect by a noise environment.

Moreover, a magnetic signal of a magnetic card is usually large enough in comparison with a noise, so that the magnetic signal can be read out even when the slice level is raised and the magnetic detection sensitivity is lowered. Nevertheless, unfortunately a reading margin for a lessened-magnetism card is lowered if the magnetic detection sensitivity is lowered in a simple manner. On the other hand, the card reader 1 according to the embodiment of the present invention is provided with the threshold switching unit 140; and therefore, the margin for a lessened-magnetism card can properly be set, even in a noise environment. Accordingly, a reading rate in general with respect to the card 2 can be improved.

Furthermore, in the case of a conventional card reader in which a sensitivity and the like are slightly changed; the magnetic detection sensitivity is raised just a little in order to cope with a lessened-magnetism card, after simply detecting the card having been inserted. If the magnetic detection sensitivity is simply raised just a little in this way, a lot of foreign noise is obtained. Therefore, in the case where a foreign noise is large in an entire frequency range for reading a magnetic stripe, magnetic information cannot be read out at all, and then it becomes impossible to get out of the error condition. Meanwhile, in the card reader 1 according to the embodiment of the present invention, the slice level is temporarily adjusted. Thus, by way of adjusting the slice level for a lessened-magnetism card, a potential of reading performance ability can be raised. Accordingly, a reading rate in general with respect to the card 2 can be improved.

Meanwhile, a foreign noise is constantly generated from a mobile phone base station, a Wi-Fi router, a security gate for theft prevention, and other electronic devices, with no relation to an ordinary reading level. If once such a foreign noise is received; conventionally a reading process cannot sometimes be carried out in a normal way, depending on a card reader; for example, in such a way that a gate for reading operation may open before a normal reading process, or the reading process may start before obtaining an actual magnetic signal of a card.

On the other hand, the card reader 1 according to the embodiment of the present invention is provided with the front sensor 7 and the rear sensor 8, as a detection sensor. Then, the magnetic card detection unit 40 can make a judgment with respect to an insertion of the card 2, according to a detection signal from the front sensor 7 and the rear sensor 8, and a detection output signal from the output signal detection unit 10. Therefore, it is possible to avoid a reading error to be caused when the gate for reading operation opens in a noise environment owing to a false detection on the card 2.

Moreover, in the case of an intense foreign noise around the card reader, conventionally there is a risk of deterioration in magnetic card reading performance owing to a noise entering through the magnetic head 6, as described above. Meanwhile, there are various environments for installation of a card reader, and conventionally it is difficult to figure out in advance a level of a noise having an effect on reading magnetic datum by a card reader. On the other hand, the card reader 1 according to the embodiment of the present invention can improve a potential of reading performance in order to read the card 2, by way of learning about the noise environment.

Furthermore, in the card reader 1 according to the embodiment of the present invention, the judgment unit 130 learns about the noise environment entering through the magnetic head 6. Then, if the noise is almost constant in the environment, the slice level is either modified so as to be a level with which it becomes possible to read information recorded in the card 2 at a first reading operation, or modified so as to be each one of a plurality of slice levels, with which it is expected that reading operation can be done, in a sequential order. By making a configuration in this way, it becomes possible to change the magnetic detection sensitivity for sure, in accordance with the noise environment of a location where the card reader 1 is installed. Accordingly, it is possible to reduce a risk of a reading error on the card 2 in the noise environment.

Moreover, in the card reader 1 of at least an embodiment of the present invention, the judgment unit 130 learns about the noise environment entering through the magnetic head 6; and then, sequentially modifies the slice level of the comparator 120 of the output signal detection unit 10, in such a way as to follow a fluctuating noise pattern, if the noise is almost not constant in the environment. By making a configuration in this way, it is possible to detect that the noise is drastically fluctuating in the environment, and to set a follow-up in such a way as to follow the fluctuating noise. Accordingly, a potential for reading out information of the card 2 can be improved. Namely, in the card reader 1 according to the embodiment of the present invention, learning about the noise environment is carried out by the judgment unit 130; and it is possible to normally maintain an operation of reading the card 2, while avoiding a situation where a magnetic signal of the card 2 cannot be read out at all owing to an effect of the noise, and sequentially setting an appropriate level of the magnetic detection sensitivity. In other words, the card reader 1 can modify the magnetic detection sensitivity with a most appropriate slice level for modification in a sequential order, in the noise environment; and a potential of reading the card 2 can be improved, even in the noise environment.

Other Embodiments

Incidentally, in the embodiment described above, there is illustrated the card reader 1 of a dip type, by an example. Namely, explained is an example in which the card reader 1 is a card media processing device for reproducing a datum recorded in the card 2 and recording a datum into the card 2, by a user manually operating the card 2 as a card medium. Meanwhile, the card reader 1 is not limited to this type of device, and devices of various other types can be employed. For example, as a manual card reader, there exists a so-called swipe-type card reader, with which a magnetic datum of the card 2 is read out while the card 2 is transferred along a groove-like card path shaped so as to have a groove being shallower than a width-wise dimension of the card. At least an embodiment of the present invention can also be applied to such a swipe-type card reader. Moreover, at least an embodiment of the present invention can be applied to a card reader of a card-transfer-type as well, which is provided with a transfer mechanism for the card 2 using a drive source, such as a motor and the like. By making a configuration in this way, reading errors can be reduced even in card readers of various types. Furthermore, it becomes possible to optimally change the magnetic detection sensitivity, corresponding to each card reader of various types.

Moreover, although only an optical sensor to be used as the front sensor 7 and the rear sensor 8 is explained in the embodiment described above, it is still possible to employ a detection sensor of a mechanical-type or a sonic type, instead. By making a configuration in this way, it becomes possible to cope with a card reader of various types.

Meanwhile, there is described in the embodiment mentioned above; that the output signal detection unit 10 learns about the noise environment in the magnetic detection sensitivity setting process, by way of the noise environment learning process, in the case where it is needed to set an initial value for the slice level at a time of start-up or resetting. Alternatively, the noise environment entering through the magnetic head 6 may be learned in a state where the card 2 is not inserted, either at a time when the card reader 1 is installed, and gets started or reset; or at a time of an instruction to reconfigure the magnetic detection sensitivity.

Incidentally, in the embodiment mentioned above; there is described in such a way that the output signal detection unit 10 carries out the noise environment learning process at a time of the magnetic detection sensitivity setting process. Alternatively, the output signal detection unit 10 may execute a learning process in which only the noise environment is learned, separately from the magnetic detection sensitivity setting process. On this occasion; after making sure that the card 2 is not inserted, the judgment unit 130 of the output signal detection unit 10 may detect whether or not a detection output signal is output from the signal detection unit 100, while modifying the slice level of the comparator 120 by about several hundreds of microseconds by use of the threshold switching unit 140, for example, in a certain period of several seconds to several hours. By making a configuration in this way, the judgment unit 130 can properly obtains a time-series datum with regard to a magnitude (level) of a noise.

Meanwhile, in the embodiment mentioned above; there is described in such a way that a judgment on whether or not the card is a lessened-magnetism card is made by way of detecting an error detection datum stored through the first reading operation. Alternatively, a configuration may be made in such a way that the output signal detection unit 10 or the magnetic data reading unit 20 is provided with a peak value detection unit for detecting a peak value in a magnetic signal of the card 2, so that the slice level of the comparator 120 is modified according to the peak value. By making a configuration in this way, it becomes possible to obtain a demodulated datum in a further accurate manner from the card 2, even though the card 2 is a lessened-magnetism card.

Incidentally, a configuration and operation of the embodiment described above are just an example, and it is clear that the configuration and operation can arbitrarily be changed and executed, without departing from the concept of the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic information processing device for use with a magnetic recording medium storing a magnetic signal, the magnetic information processing device comprising:
 a magnetic card detection unit comprising a sensor and being structured to detect insertion of the magnetic recording medium and output a medium detection signal indicating whether the magnetic recording medium is inserted;
 a magnetic head structured to read the magnetic signal recorded in the magnetic recording medium, and output the magnetic signal as an analog signal;
 a signal detection unit structured to amplify the analog signal output from the magnetic head, and output a detection output signal when the analog signal exceeds a predetermined threshold value of a magnetic detection sensitivity; and
 a judgment unit structured to:
  receive the medium detection signal and the detection output signal;
  identify the detection output signal as different from the magnetic signal stored in the magnetic recording medium in response to the medium detection signal indicating that the magnetic recording medium is not inserted; and
  output the detection output signal in response to the medium detection signal indicating that the magnetic recording medium is inserted.

2. The magnetic information processing device according to claim 1;
 wherein, the magnetic information processing device is a manual card reader, with which the magnetic signal recorded in the magnetic recording medium is read out at a time when a user manually inserts the magnetic recording medium into an internal section of the device, and pulls back the magnetic recording medium from the internal section of the device.

3. The magnetic information processing device according to claim 1;
 wherein the judgment unit is structured to learn about a noise environment that enters the magnetic head, and stores an initial value of the threshold value of the magnetic detection sensitivity, as a learned datum.

4. The magnetic information processing device according to claim 1;
 wherein, the threshold value of the magnetic detection sensitivity of the signal detection unit is variable, and the magnetic information processing device further comprises a threshold switching unit structured to change the magnetic detection sensitivity; and
 the judgment unit is structured to change the threshold value of the magnetic detection sensitivity of the signal detection unit by way of the threshold switching unit when the magnetic signal recorded in the magnetic recording medium is with lessened magnetism.

5. A magnetic information processing method to be executed by a magnetic information processing device comprising a magnetic card detection unit, a magnetic head, and a signal detection unit, the method comprising:
 detecting a magnetic recording medium having been inserted by use of a sensor and output a medium detection signal indicating whether the magnetic recording medium is inserted;
 reading a magnetic signal recorded in the magnetic recording medium, and outputting the magnetic signal as an analog signal; and
 amplifying the analog signal output from the magnetic head, and outputting a detection output signal in the case of the analog signal exceeding a threshold value of a magnetic detection sensitivity that has been set; and
 a judging step comprising:
  receiving the medium detection signal and the detection output signal;
  identifying the detection output signal as different from the magnetic signal stored in the magnetic recording medium in response to the medium detection signal indicating that the magnetic recording medium is not inserted; and
  outputting the detection output signal in response to the medium detection signal indicating that the magnetic recording medium is inserted.

* * * * *